US012492558B1

(12) United States Patent
Sandhar et al.

(10) Patent No.: US 12,492,558 B1
(45) Date of Patent: Dec. 9, 2025

(54) MULTI-LAYER ROOFING SYSTEM

(71) Applicant: BMIC LLC, Dallas, TX (US)

(72) Inventors: Gurpreet Singh Sandhar, Langley City (CA); Sahar Khedri, Langley City (CA)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 19/067,411

(22) Filed: Feb. 28, 2025

Related U.S. Application Data

(63) Continuation of application No. 17/665,299, filed on Feb. 4, 2022, now abandoned.

(Continued)

(51) Int. Cl.
| | |
|---|---|
| *E04D 12/00* | (2006.01) |
| *B32B 3/30* | (2006.01) |
| *B32B 5/02* | (2006.01) |
| *B32B 5/18* | (2006.01) |
| *B32B 5/26* | (2006.01) |
| *B32B 7/12* | (2006.01) |
| *C09J 175/04* | (2006.01) |
| *E04D 1/12* | (2006.01) |
| *E04D 1/34* | (2006.01) |

(52) U.S. Cl.
CPC ............. *E04D 12/002* (2013.01); *B32B 3/30* (2013.01); *B32B 5/022* (2013.01); *B32B 5/028* (2013.01); *B32B 5/18* (2013.01); *B32B 5/273* (2021.05); *B32B 7/12* (2013.01); *C09J 175/04* (2013.01); *E04D 1/12* (2013.01); *E04D 1/34* (2013.01); *B32B 2262/0284* (2013.01); *B32B 2266/0278* (2013.01); *B32B 2307/54* (2013.01); *B32B 2307/5825* (2013.01); *B32B 2307/718* (2013.01); *B32B 2307/744* (2013.01); *B32B 2307/748* (2013.01); *B32B 2419/06* (2013.01); *E04D 2001/3435* (2013.01)

(58) Field of Classification Search
CPC . E04D 12/002; E04D 1/34; E04D 2001/3435; B32B 5/262; B32B 5/024; B32B 5/028; B32B 7/12; B32B 2262/0284
See application file for complete search history.

(56) References Cited

U.S. PATENT DOCUMENTS

| | | | |
|---|---|---|---|
| 4,996,812 A | * | 3/1991 | Venable .................. E04D 5/143 52/408 |
| 5,219,635 A | | 6/1993 | Weiter et al. |

(Continued)

FOREIGN PATENT DOCUMENTS

DE          19642252 A1     8/1997

*Primary Examiner* — Brian E Glessner
*Assistant Examiner* — Daniel J Kenny
(74) *Attorney, Agent, or Firm* — GREENBERG TRAURIG, LLP

(57) ABSTRACT

A roofing system includes a roof deck, a roofing underlayment overlying the roof deck, a foam adhesive on an uppermost surface of the roofing underlayment, and a roofing material on the foam adhesive. The roofing material may include roofing tile. The roofing underlayment includes a first fleece layer contacting a surface of the roof deck, a scrim layer overlying and contacting the first fleece layer, and a second fleece layer overlying and contacting the scrim layer. The second fleece layer includes polyethylene terephthalate and has an uppermost surface opposite to the scrim layer, where the uppermost surface has an embossed texture.

16 Claims, 7 Drawing Sheets

Related U.S. Application Data

(60) Provisional application No. 63/304,500, filed on Jan. 28, 2022.

(56) References Cited

U.S. PATENT DOCUMENTS

| | | | |
|---|---|---|---|
| 5,660,915 A | 8/1997 | Schoeps et al. | |
| 5,687,517 A | 11/1997 | Wiercinski | |
| 5,694,736 A | 12/1997 | Saether et al. | |
| 6,679,018 B2 | 1/2004 | Georgeau | |
| 6,742,313 B2 | 6/2004 | Ritland | |
| 6,925,766 B2 | 8/2005 | Di Pede | |
| 6,938,386 B2 | 9/2005 | Ritland | |
| 8,701,367 B2 | 4/2014 | Georgeau | |
| 9,314,994 B2 | 4/2016 | Strait | |
| 9,637,926 B2 | 5/2017 | Kraus, Jr. | |
| 9,677,280 B2 | 6/2017 | Canales | |
| 9,982,437 B2 | 5/2018 | Barrego | |
| 10,138,633 B2 | 11/2018 | Khan | |
| 11,454,028 B2 | 9/2022 | Rufus | |
| 11,542,711 B2 | 1/2023 | Sandhar | |
| 11,613,892 B2 | 3/2023 | Zheng | |
| 11,767,674 B2 | 9/2023 | Sandhar | |
| 11,927,015 B2 | 3/2024 | Sandhar | |
| 11,939,773 B2 | 3/2024 | Rufus | |
| 12,195,974 B2 | 1/2025 | Yang | |
| 2002/0187693 A1 | 12/2002 | Cherry | |
| 2006/0052016 A1 | 3/2006 | Ritland | |
| 2007/0044397 A1* | 3/2007 | Wiercinski | E04D 5/10 52/177 |
| 2010/0178827 A1 | 7/2010 | Thai et al. | |
| 2011/0027536 A1* | 2/2011 | Malpass | B32B 3/28 264/293 |
| 2011/0276536 A1 | 11/2011 | Castaneda | |
| 2016/0369511 A1 | 12/2016 | Sandhar | |
| 2021/0310250 A1 | 10/2021 | Faotto | |
| 2022/0290434 A1 | 9/2022 | Cheung | |
| 2022/0389717 A1 | 12/2022 | Rufus | |
| 2023/0295929 A1 | 9/2023 | Sandhar | |
| 2024/0117635 A1 | 4/2024 | Sandhar | |
| 2025/0188743 A1 | 6/2025 | Rufus | |

* cited by examiner

MULTI-LAYER ROOFING SYSTEM

FIELD OF THE INVENTION

The invention pertains to embossed fleece materials, and methods of embossing fleece materials for use as exterior sheets suitable for underlayments, such as roofing underlayments.

BACKGROUND OF THE INVENTION

Existing roofing underlayments often show signs of damage, such as delamination of layers therebetween or water damage in extreme weather conditions. It is desirable to have exterior sheets for roofing underlayments that can withstand extreme climates, such as in high wind regions. The present invention is directed to improved exterior sheets for use in roofing underlayments.

SUMMARY

One aspect of the invention provides an underlayment comprising an exterior sheet which has a layer of fleece with an embossed texture on one or both surfaces thereof. The exterior sheet may be formed of a single layer consisting of the embossed fleece layer, or comprise multiple layers with the embossed fleece layer arranged on an uppermost layer of the exterior sheet. The fleece comprises polyethylene terephthalate (PET). In some embodiments, the exterior sheet comprises a second layer of fleece.

One application of the underlayment is for incorporation in a roofing system. The roofing system includes a roof deck, the underlayment arranged on the roof deck with the embossed surface of the fleece layer arranged at the uppermost layer of the underlayment, and a foam adhesive, such as an expandable polyurethane foam adhesive, arranged on the embossed surface for adhering roof tiles thereon. An underlayment with an exterior sheet which comprises an embossed texture on one or both of the surfaces of the fleece provides certain advantages over an underlayment with an exterior sheet which comprises a plain, unembossed, fleece layer. Such advantages include providing an improved slip-resistant walking surface, increased adhesion between the expandable foam adhesive and the underlayment, and/or increased water repellency or hydrophobicity of the underlayment. An underlayment with polyethylene terephthalate (PET) as the fleece layer has shown to further increase the adhesion strength between the underlayment and the expandable foam adhesive.

Another aspect of the invention provides a method of embossing a fleece material for use as exterior sheets suitable for roofing underlayments. The method may comprise embossing a layer of plain (i.e., unembossed) fleece material using an off-line method of embossment where the plain fleece material is first produced on a fabric production line and is then fed to a hot embossing line, separate from the fabric production line, after the plain fleece fabric is formed and cooled to a rigid state. In embodiments of the method in which the exterior sheet comprises multiple layers, the plain fleece material and the other layers which form the exterior sheet may first be bonded together on the fabric production line to form a composite exterior sheet. The composite exterior sheet is then fed to the hot embossing line for embossment. Alternatively, the plain fleece material and the other layers which form the exterior sheet may be made on separate fabric production lines. The plain fleece material may be fed to the hot embossing line for embossment. The embossed fleece may then be bonded to the other layers to form the composite exterior sheet. In other embodiments of the method, the embossment of the fleece material is prepared using an on-line method of embossment in which both the production and embossment of the fabric are carried out on the fabric production line.

Further aspects of the invention and features of specific embodiments of the invention are described below.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1:
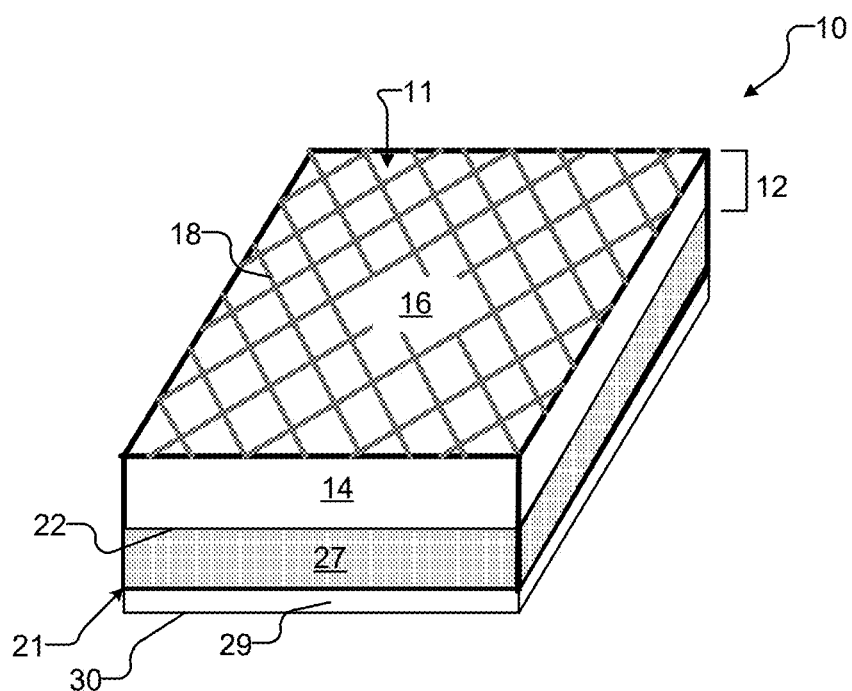
FIG. 1 is a schematic diagram showing a roofing underlayment according to a first example embodiment.

The invention provides an underlayment such as a roofing underlayment having an exterior sheet comprising a layer of fleece with an embossed texture provided on at least one surface of the fleece. As used herein, the term "fleece" means any non-woven fabric prepared from a single type of polymeric fibers or filaments, or a combination of two or more different types of polymeric fibers of filaments (i.e., mixed fibers or filaments). The term "fleece" as used herein is intended to be used interchangeably with the term "felt."

Referring to FIGS. 1 to 4, the underlayment 10, such as a roofing underlayment, includes an exterior sheet 12 comprising a layer of embossed fleece 14 arranged on an uppermost layer 11 of the exterior sheet 12 which is an outermost layer of the underlayment 10 such that a first surface 16 of the embossed fleece 14 is exposed to the environment when the underlayment 10 is applied on a roof deck. The embossed fleece 14 may be prepared from polyester filaments such as those prepared from polyethylene terephthalate (PET). The first surface 16 of the embossed fleece 14 has an embossed texture 18 provided thereon. A second surface 22 of the embossed fleece 14, opposite to the first surface 16, may have an embossed texture provided thereon, or may be plain (i.e., without an embossed texture pressed thereon). The embossed texture 18 on the first surface 16 (and the second surface 22 in embodiments in which the second surface 22 also has an embossed texture) of the embossed fleece 14 may include raised and/or sunken features of the same shape or varying shapes that are arranged adjacent to or spaced apart from each other. The embossed texture includes for example ovals, diamonds, squares, and triangles. An embossed texture on the first surface 16 of the embossed fleece 14 forms an enhanced friction or slip-resistant walking surface. An embossed second surface 22 may facilitate the ease of repositioning of a self-adhesive underlayment on a structural support member, such as a roof deck. The embossed texture creates unevenness on the second surface 22, thereby reducing the effective contact area between the bonding material (e.g., the second bonding material 27 shown in FIG. 1) that is applied on the embossed second surface and the structural support member.

Figure 10A:
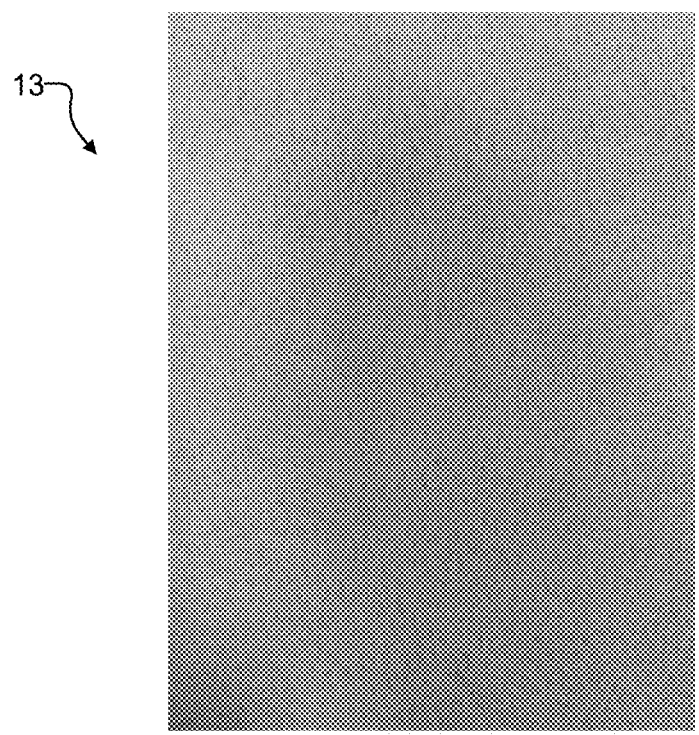
FIG. 10A is a photograph showing the surface of a plain, unembossed polyethylene terephthalate (PET) fabric.
Figure 10B:
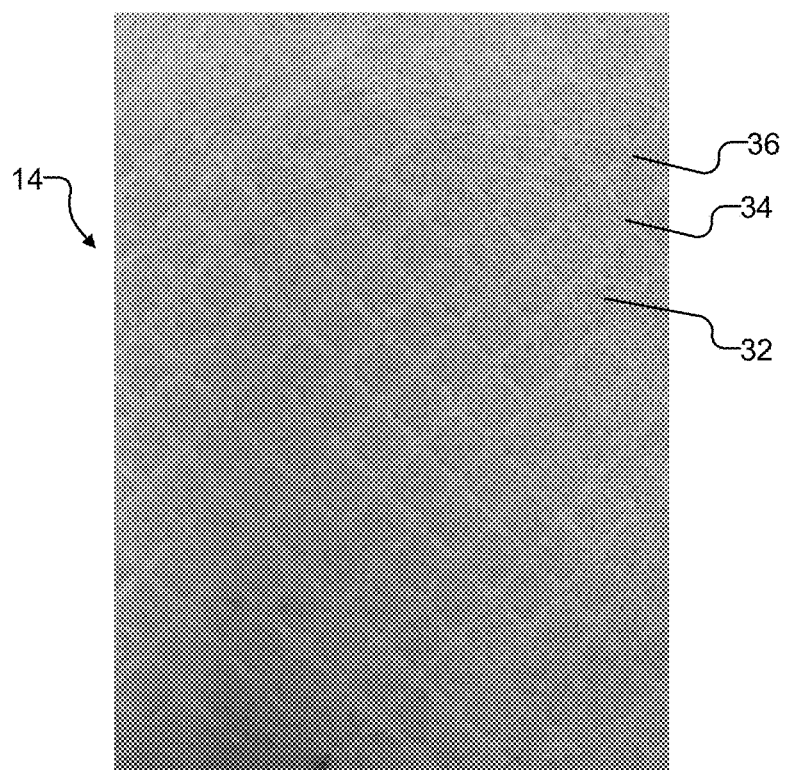
FIG. 10B is a photograph showing the surface of the embossed PET fabric produced by the method of FIG. 7.
Figure 11:
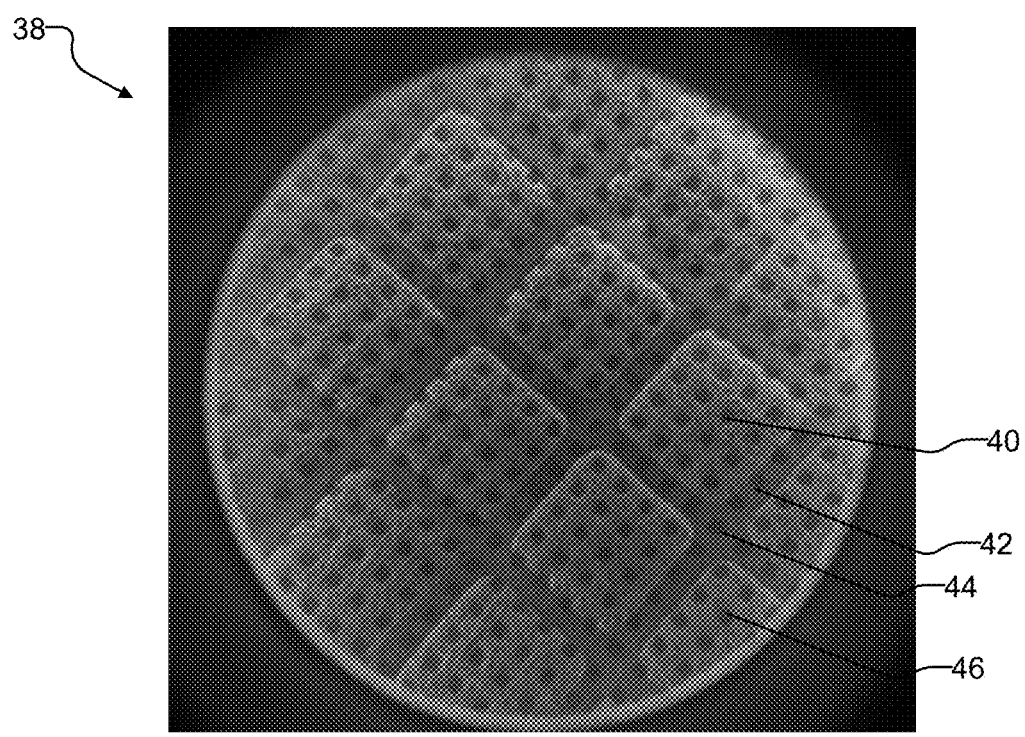
FIG. 11 is a photograph showing the surface of an embossed spunbond non-woven fabric produced by the method of FIG. 7.

FIG. 10B is a photograph illustrating an example embossed fleece 14 prepared using an off-line embossment method (i.e., the embossment being performed on a embossing line which is separate from the fabric production line), with FIG. 10A illustrating a plain fleece 13 (i.e., without an embossed texture on its surfaces) as a comparison. An example off-line embossment method is shown schematically in FIG. 7 which will be discussed in detail below. Referring to FIG. 10B, the embossed fleece 14 includes a plurality of raised portions 32 (in the shape of diamonds in the illustrated embodiment), each of which are separated by depressed portions 34. The depressed portions 34 are joined to form a plurality of channels 36 which encircle the raised portions 32. The depressed portions 34 or channels 36 of the embossed fleece 14 are formed with a plurality of un-melted and loose fibers comprising inconsistent lengths. The embossment pattern on the embossed fleece 14 is different from the embossment pattern on an embossed spunbond non-woven fabric. An example embossed spunbond non-woven fabric prepared using an off-line embossment method is shown in the FIG. 11 photograph. Referring to FIG. 11, the embossed spunbond non-woven fabric 38 includes a plurality of raised portions 40 (in the shape of diamonds in the illustrated embodiment), each of which are separated by depressed portions 42. The depressed portions 42 are joined to form a plurality of channels 44 which encircle the raised portions 42. Within each of the raised portions 40 and depressed portions 42 or channels 44 include a plurality of textures 46 (in the shape of diamonds in the illustrated embodiment). Each of the textures 46 has a surface area that is less than the surface area of each of the raised portions 40. By contrast with the FIG. 10B embossed fleece 14, the depressed portions 34 or channels 36 of the embossed fleece 14 are plain, i.e., without textures pressed thereon, unlike the textures 46 found within the depressed portions 42 or channels 44 of the spunbond non-woven fabric 38.

Figure 2:
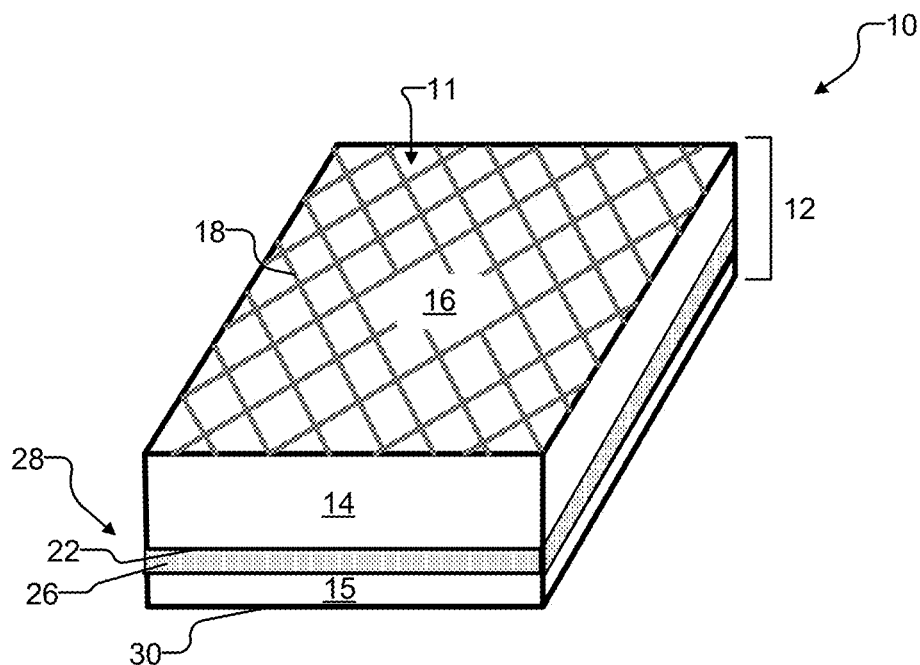
FIG. 2 is a schematic diagram showing a roofing underlayment according to a second example embodiment.
Figure 3:
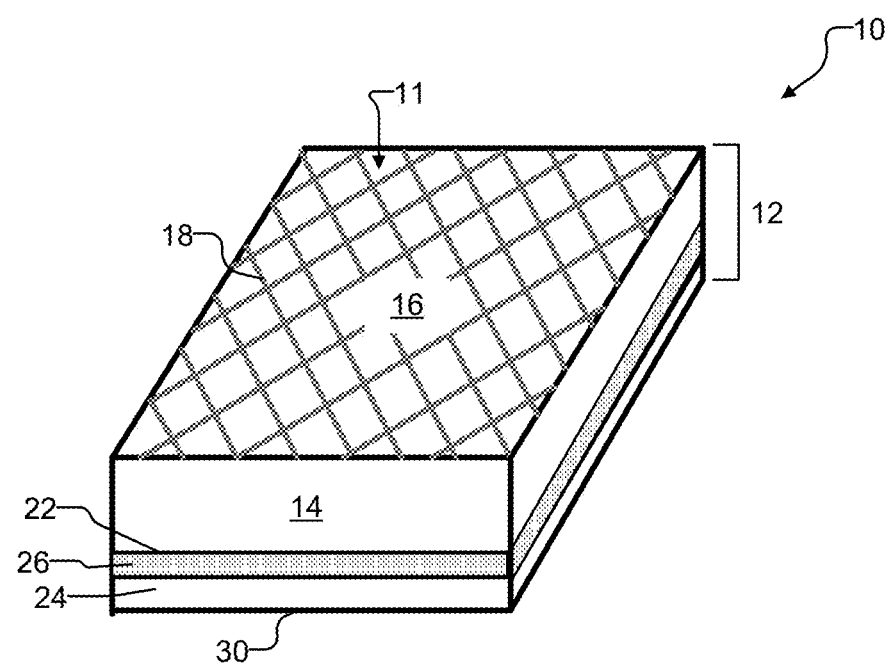
FIG. 3 is a schematic diagram showing a roofing underlayment according to a third example embodiment.
Figure 4:
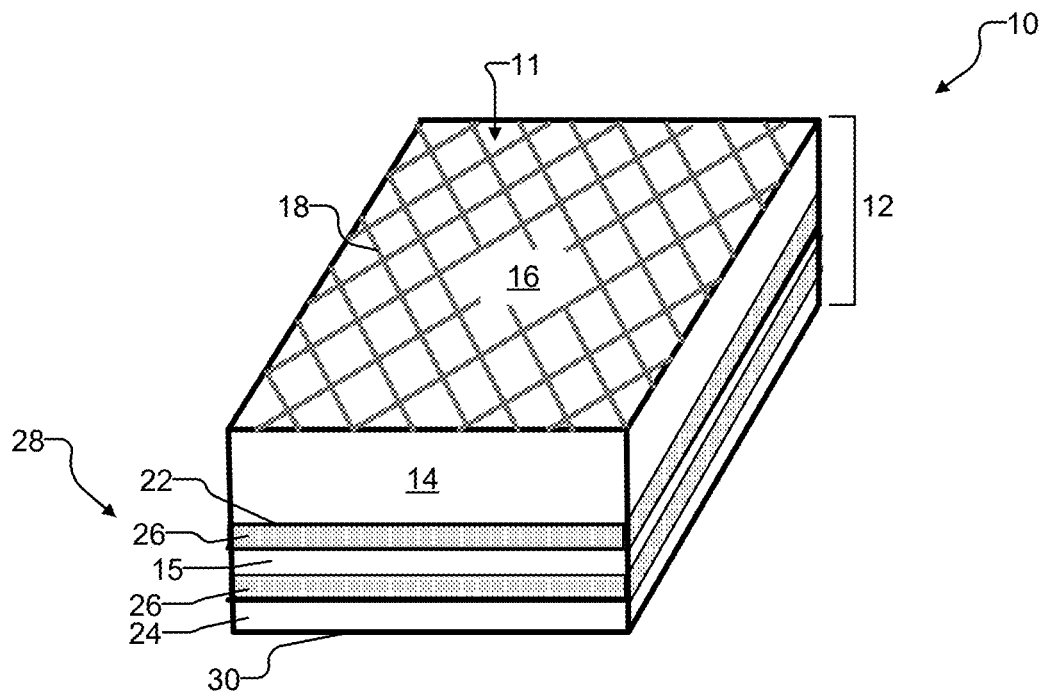
FIG. 4 is a schematic diagram showing a roofing underlayment according to a fourth example embodiment.

The exterior sheet 12 may consist of the embossed fleece 14 (as shown in the FIG. 1 embodiment). Alternatively, the exterior sheet 12 may comprise multiple layers to form a composite exterior sheet 12 which includes the embossed fleece 14 (as shown in the FIGS. 2, 3 and 4 embodiments). A composite exterior sheet 12 may comprise any suitable number of layers and any suitable combination of materials so as to provide the desired properties (e.g., strength, thickness, colour, and water, fire and/or UV resistance) of the exterior sheet 12. FIGS. 2, 3 and 4 illustrate non-exhaustive examples of suitable composite exterior sheets 12 to form the underlayment 10.

As shown in the FIG. 2 embodiment, the exterior sheet 12 comprises a reinforcing material 15 such as a woven scrim (e.g., fiberglass scrim, fiberglass yarns in both the machine and cross-machine directions, polypropylene scrim and polyethylene scrim) bonded to the embossed fleece 14 to form a reinforced fleece layer 28. The reinforced fleece layer 28 may be formed by applying a bonding material 26 between the embossed fleece 14 and the reinforcing material 15.

As shown in the FIG. 3 embodiment, the exterior sheet 12 comprises a second layer of fleece 24 bonded to the embossed fleece 14. The embossed fleece 14 and the second layer of fleece 24 may be bonded together by providing a bonding material 26 therebetween. As shown in the FIG. 4 embodiment, the exterior sheet 12 comprises the reinforced fleece layer 28 bonded to the second layer of fleece 24. The reinforced fleece layer 28 and the second layer of fleece 24 may be bonded together by applying a bonding material 26 therebetween. The second layer of fleece 24 may include polymeric fibers or filaments such as those prepared from PET, polyethylene or polypropylene. In some embodiments, both the first layer of fleece 14 and the second layer of fleece 24 comprise a reinforcing material to form two reinforced fleece layers. The two reinforced fleece layers may be bonded together by applying a bonding material 26 therebetween.

The bonding material 26 may comprise a thermoset or a thermoplastic to form a pressure sensitive adhesive (i.e., an adhesive that forms a bond when pressure is applied to bond the adhesive with a surface) or a temperature sensitive adhesive (i.e., an adhesive which is activated by heat). In some embodiments, the bonding material 26 is made from butyl rubber or rubber modified asphalt (bitumen). Alternatively, the bonding material 26 is made from a polymeric bonding layer such as ethylene-vinyl acetate (EVA), Lotader™, thermoplastic elastomers (TPE), and/or thermoplastic polyolefin (TPO). The bonding material 26 may comprise one or more thermoplastic components, and may optionally include organic and/or inorganic fillers, colorants, ultraviolet light absorbers, dyes, pigments and other additives.

Figure 5A:
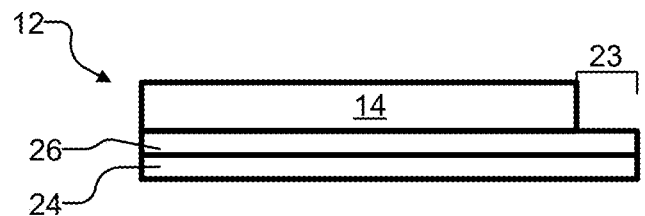
FIG. 5A is a schematic diagram showing a roofing underlayment according to a fifth example embodiment.
Figure 5B:
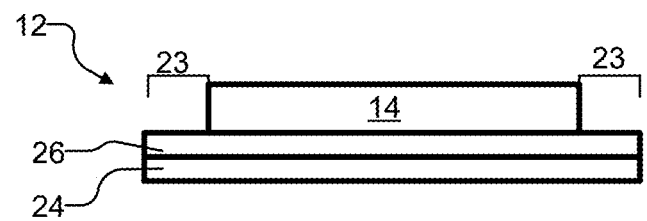
FIG. 5B is a schematic diagram showing a roofing underlayment according to a sixth example embodiment.

In embodiments in which the exterior sheet comprises three or more layers, one or more selvage edges may be disposed in one or more of the layers of the underlayment along one or more sides thereof. On installation, each selvage edge overlaps and covers the other underlayment that are laid down longitudinally and parallel to each other. As shown in the FIGS. 5A and 5B example embodiments, the exterior sheet 12 comprises the first layer of fleece 14, the second layer of fleece 24, and the bonding material 26 arranged between the first and second layers of fleece 14, 24. In one embodiment, as shown in FIG. 5A, a selvage edge 23 is disposed in the first layer of fleece 14 along one side, for example, in the machine direction of the underlayment 10. In another embodiment, as shown in FIG. 5B, two selvage edges 23 are disposed in the first layer of fleece 14, along both sides, for example, in the machine direction of the underlayment 10. The bonding material 26 in the selvage edge 23 may facilitate the sealability of the overlapping underlayments. The selvage edge 23 may for example have a width of 0.5 inches to 6 inches, alternatively 1 inch to 5 inches, or alternatively 2 inches to 4 inches.

In example embodiments of this invention, the composite exterior sheet 12 has a weight of 90 to 1000 g/m$^2$, alternatively 150 to 950 g/m$^2$, alternatively 200 to 900 g/m$^2$, alternatively 300 to 800 g/m², alternatively 400 to 700 g/m², alternatively 500 to 600 g/m², or alternatively 550 to 650 g/m². The embossed fleece 14 and the second layer of fleece 28 (if present) may each have a weight of at least 100 g/m², and/or a thickness of at least 30 mils. In some embodiments, the embossed fleece 14 and the second layer of fleece 28 (if present) each has a weight in the range of 90 g/m² to 500 g/m², alternatively 150 g/m² to 450 g/m², alternatively 200 g/m² to 400 g/m², alternatively 250 g/m² to 350 g/m², or alternatively 275 g/m² to 325 g/m², and/or a thickness in the range of 30 mils to 80 mils, alternatively 40 to 70 mils, or alternatively 50 to 60 mils.

In some embodiments, as shown in FIG. 1, the underlayment 10 comprises a roof deck bonding material 27 arranged on the bottommost layer 21 thereof to form a self-adhesive underlayment (i.e., an underlayment that can adhere to surfaces without requiring mechanical fastener means). A release liner 29 may be arranged on the roof deck bonding material 27 to protect the adhesive from premature adhering to other undesired surfaces before application. Examples of suitable roof deck bonding material 27 include an adhesive, rubber modified asphalt (bitumen), butyl rubber and polymeric bonding material such as ethylene-vinyl acetate (EVA).

Figure 6:
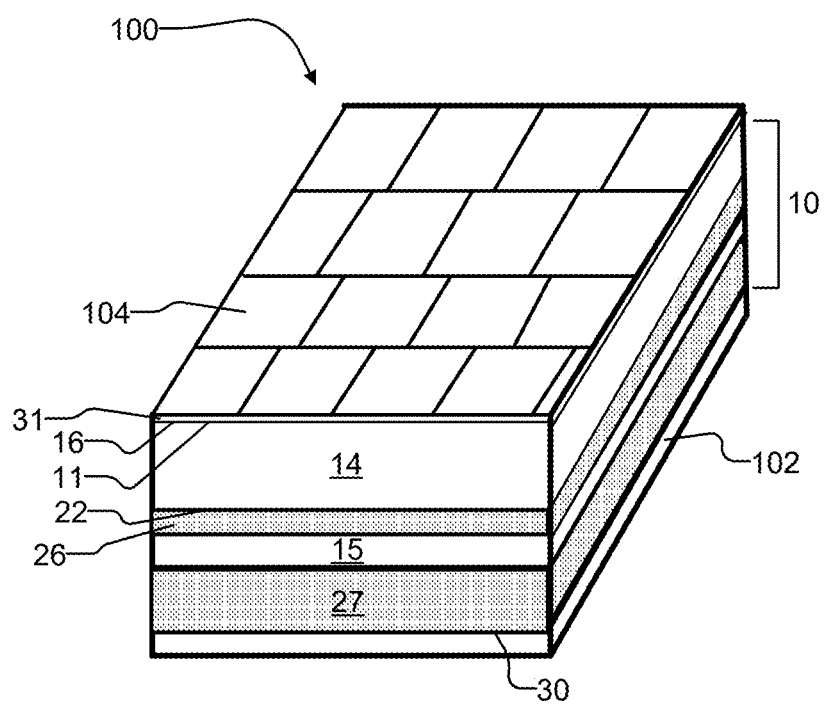
FIG. 6 is a schematic diagram showing a roofing underlayment adhered between a roofing deck and a plurality of roofing tiles.

One application of the underlayment 10 is for use in a roofing system. Referring to FIG. 6, a roofing system 100 includes a roof deck 102 and the underlayment 10 arranged thereon, with the bottommost surface 30 of the underlayment 10 arranged to contact a surface of the roof deck 102. The bottommost surface 30 of the underlayment 10 may comprise the roof deck bonding material 27 such that the underlayment 10 self-adheres to the roof deck 102. Alternatively, the underlayment 10 may be affixed to the roof deck 102 by mechanical fasteners such as screws and the like. The roofing system 100 includes a foam adhesive 31 applied on the embossed first surface 16 of the first fleece material 14, i.e., on the surface of the uppermost layer 11 of the exterior sheet 12 of the underlayment 10, so as to adhere one or more roof tiles 104 thereon.

The foam adhesive 31 may be a roof tile foam adhesive system. In example embodiments, the foam adhesive 31 comprises an expandable foam adhesive. An "expandable foam adhesive" comprises a foam made of a material with adhesive properties which expands and cures upon application. The expanding and curing of the foam occurs during a reactivity period to form an adhesive. In an example embodiment, the foam adhesive is an expandable polyurethane foam spray adhesive. Non-exhaustive examples of commercially available foam adhesives 31 include the polyurethane-based insulating foam sealant products sold under the trademarks Polyset® AH-160, Polyset® RTA-1, LePage® Tite Foam and Dow Chemical® Tite Foam.

The inventors have discovered that embossed fleece underlayments are particularly suitable for use in roofing systems that are installed in areas of extreme climates, for example, in high wind zone regions such as in the state of Florida in the United States. Embossed fleece underlayments, in particular fleece that is prepared by polyethylene terephthalate (PET), provide at least the advantages of high slip resistance, strong adhesion between the embossed fleece 14 and the foam adhesive 31 which advantageously prevents the delamination of the layers, and/or high degree of water repellency or hydrophobicity. The hydrophobicity of a surface can be measured by the water contact angle between a water droplet and the surface. As the hydrophobicity of the surface increases, the contact angle increases. If the contact angle is at least 90 degrees, the surface is considered to be hydrophobic. If the contact angle is less than 90 degrees, the surface is considered to be hydrophilic.

In some embodiments, the first surface 16 of the embossed fleece 14 is hydrophobic. In some embodiments, the first surface 16 of the embossed fleece 14 has a water contact angle of at least 90 degrees, or alternatively greater than 90 degrees as measured after 30 minutes in accordance with ASTM D7334. In some embodiments, the first surface 16 of the embossed fleece 14 exhibits a decrease in water contact angle of 1 to 40%, alternatively 2 to 15%, alternatively 5 to 15%, alternatively 10 to 35%, alternatively 20 to 30%, or alternatively 30 to 40% as measured after three minutes in accordance with ASTM D7334. In some embodiments, the first surface 16 of the embossed fleece 14 exhibits a decrease in water contact angle of 2 to 40%, alternatively 2 to 15%, alternatively 10 to 35%, alternatively 20 to 30%, or alternatively 30 to 40% as measured after 10 minutes in accordance with ASTM D7334. In some embodiments, the first surface 16 of the embossed fleece 14 exhibits a decrease in water contact angle of 5 to 40%, alternatively 5 to 20%, alternatively 10 to 35%, alternatively 20 to 30%, or alternatively 30 to 40% as measured after 30 minutes in accordance with ASTM D7334.

The inventors have found that the adhesion strength between the foam adhesive 31 and the underlayment 10 is greater where the foam adhesive 31 is bonded to an embossed fleece 14 as compared to being bonded to a plain layer of fleece (i.e., the same fleece material without embossment). The increased adhesion may be the result of the increase in surface area created by the embossment, creating more active surface area for the foam adhesive 31 to adhere onto the surface of the exterior sheet 12. The increased adhesion may also be the result of the presence of the depressed portions or channels created by the embossment, creating small spaces to allow the foam to expand therein, thereby securing the foam adhesive 31 within such spaces. In some embodiments, the adhesion strength between the embossed fleece 14 and the foam adhesive 31 is greater than about 10 pound force (lbf) per/three inches (3 in), or greater than about 15 lbf/3 in. In some embodiments, the adhesion strength between the embossed fleece 14 and the foam adhesive 31 is 10 lbf/3 in to 30 lbf/3 in, alternatively 10 lbf/3 in to 20 lbf/3 in, or alternatively 15 lbf/3 in to 25 lbf/3 in. In some embodiments, the adhesion strength between the embossed fleece 14 and the foam adhesive 31 may be 20% to 60% greater, alternatively 30 to 50% greater, or alternatively 40 to 45% greater than the adhesion strength between a plain, unembossed, fleece material 13 and the foam adhesive 31.

The inventors have also found that the adhesion strength between the foam adhesive 31 and the underlayment 10 is greater where the foam adhesive 31 is bonded to an embossed fleece 14 that is prepared from polyethylene terephthalate (PET) as compared to being bonded to other types of fleece materials such as polypropylene (PP) fleece.

Figure 7:
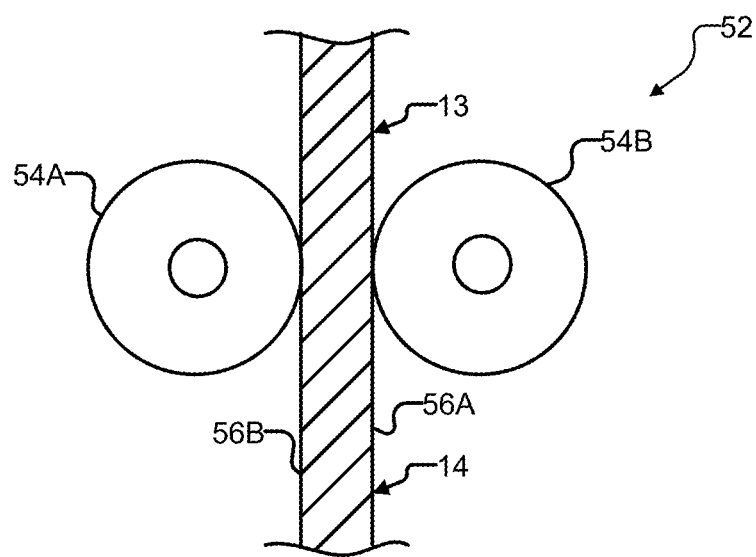
FIG. 7 is a schematic diagram showing an embodiment of a method of embossing a fleece material.

Another aspect of the invention provides a method of embossing a layer of fleece for use as an exterior sheet of an underlayment, such as a roofing underlayment. FIG. 7 illustrates a method of embossing the layer of fleece according to an example embodiment. Referring to FIG. 7, the method begins with a layer of fleece 13 which may be plain (i.e., a fleece material without an embossed texture on its surface), and in a rigid state, arranged to be fed through a hot embossing line to produce the embossed fleece 14. The embossing line 52 includes a pair of spaced-apart rotatable rollers 54A, 54B through which a layer of plain fleece material 13 is fed therebetween. The embossing line 52 is separate from the fabric production line of the fleece material 13, i.e., the fleece material 13 that is introduced to the embossing line 52 is removed from the fabric production line, and has been sufficiently cooled to be in a rigid state. The fleece material 13 is arranged to be pressed between the rotating rollers 54A, 54B, which are heated, as the fleece material 13 is being fed between them. One or both of the rollers 54A, 54B may be heated to and maintained at a temperature in a range of from about 50° C. to about 160° C. The rollers 54A, 54B may be arranged to be separated by a gap of between 0.1 mm to about 2.5 mm so as to allow the fleece material 13 to be pressed therebetween.

One or both of the rotatable rollers 54A, 54B is an embossing roller which has a surface with a texture formed of a plurality of features that are raised (e.g., protrusions) and/or sunken (e.g., depressions) with respect to its surface so as to provide the desired embossed inverse texture on the plain fleece material 13. In embodiments of the method which include two embossing rollers, both the first 56A and the opposite second 56B surfaces of the resulting embossed fleece 14 have an inverse texture corresponding to the textures on the surfaces of the respective embossing rollers 54A, 54B. In embodiments of the method which include a pair of rotatable rollers 54A, 54B with one embossing roller and one smooth surfaced pressure roller, only one of the surfaces 56A, 56B of the resulting embossed fleece 14 has an inverse texture disposed thereon, and the other surface 56A, 56B is smooth after the plain fleece material 13 is being pressed between the rollers 54A, 54B.

In other embodiments, the method begins with a reinforced fleece layer (i.e., a layer of fleece 13, which may be plain, bonded to a reinforcing material 15). The reinforced fleece layer may be fed through the hot embossing line to produce a reinforced embossed fleece layer.

Figure 8:
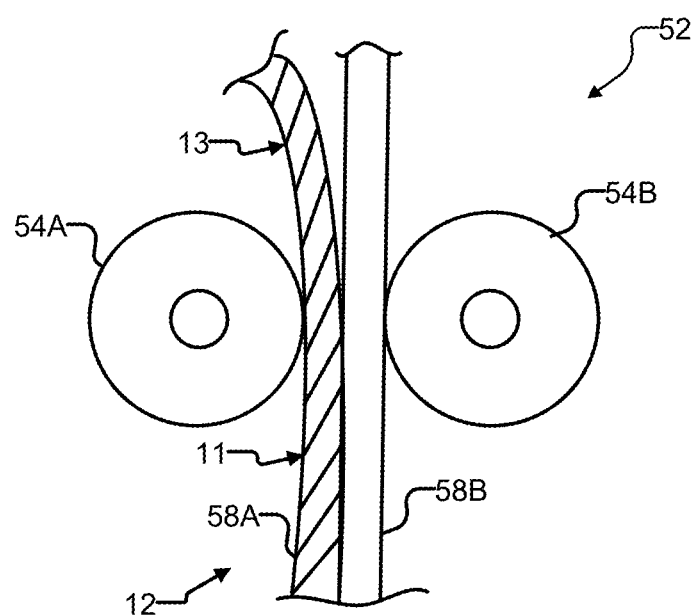
FIG. 8 is a schematic diagram showing a second embodiment of a method of embossing a fleece material.

In some embodiments of the method (as illustrated in FIG. 8), a composite exterior sheet 12 may be formed on the embossing line 52. In such embodiment, a plurality of layers which form a composite exterior sheet 12 is thermally bonded by being pressed between the heated rotatable rollers 54A, 54B to produce an exterior sheet 12 with an embossed fleece 14 arranged at the uppermost layer 11 of the exterior sheet 12. One or both of the surfaces 58A, 58B of the composite exterior sheet 12 may be embossed, i.e., one or both of the rotatable rollers 54A, 54B may be embossing rollers.

Figure 9:
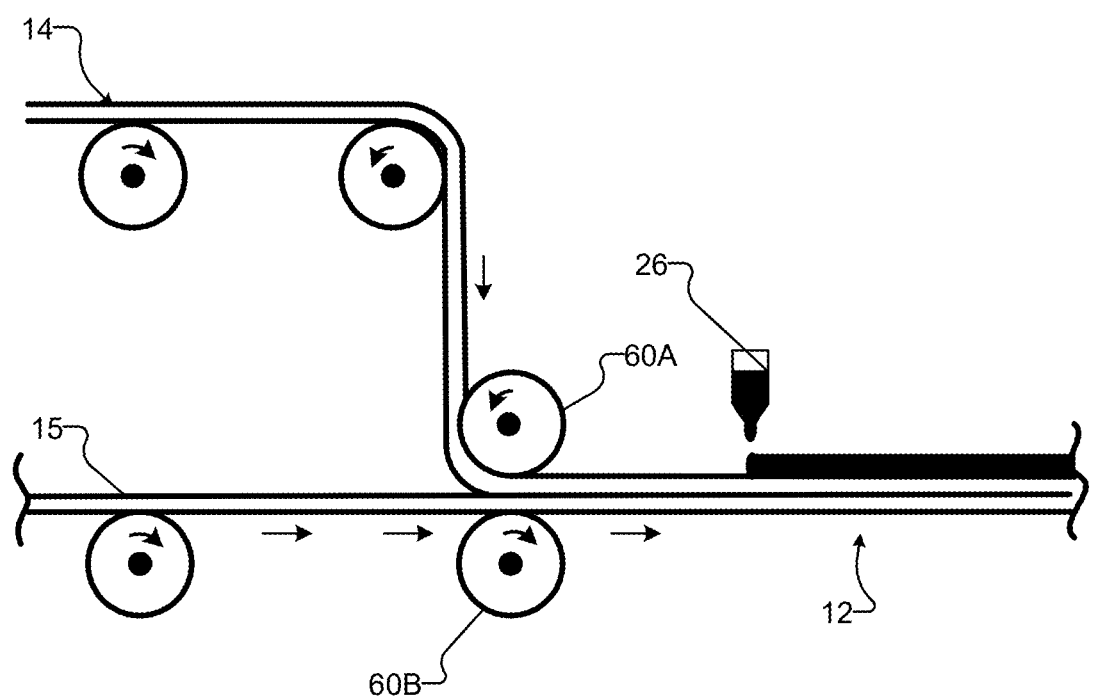
FIG. 9 is a schematic diagram showing an embodiment of a method of forming a composite exterior sheet comprising an embossed fleece material.

In other embodiments of the method, the plurality of layers which form the composite exterior sheet 12 are combined together after the embossed fleece 14 has been fed through the embossing line 52 for embossment. In such embodiments, the method begins with the embossed fleece 14. The embossed fleece 14 is bonded to one or more layers. One of the layers may be a reinforcing layer 15, e.g., an open structure fiberglass scrim to form the composite exterior sheet 12. FIG. 9 illustrates an example method of combining an embossed fleece 14 with one or more layers to form the composite exterior sheet 12. Referring to FIG. 9, the embossed fleece material 14 is applied onto the reinforcing layer 15. The embossed fleece 14 and the reinforcing layer 15 are then fed through a pair of rotatable rollers 60A, 60B. The bonding material 26 may be applied on the surface of the open structure reinforcing layer 15. The bonding material 26 may fill the gaps within the open structure reinforcing layer 15, adhering the reinforcing layer 15 to the embossed fleece 14. The open structure reinforcing layer 15 may be partially or fully sandwiched between the embossed fleece 14 and the bonding material 26.

The plain fleece material 13 may be first made on a fabric production line by any suitable conventional methods, such as chemical and thermal bonding, needle punching, and melt-blown extrusion. The fleece material 13 may be further treated on the production line, or in separate finishing operations. The finished fleece material 13 is cooled and removed from the production line, fed through a separate embossing line for embossment. Embodiments of the method involve a two-step process comprising two separate lines for producing the fleece material and embossing the fleece material.

In some embodiments of the method, the fleece material 13 is embossed using an "on-line" embossing method. An "on-line" embossing method is a one-step process of producing and embossing fabric, specifically the fabric is embossed on the fabric production line where the fiber web is formed, as opposed to a two-step process of producing and embossing fabric using separate lines for the embossment and the production, which may be referred to ad an "off-line" embossing method. In the "on-line" embossing method, the fabric may still be in a molten or unrigid, state when it is being pressed between a pair of rotating rollers where one or both of which is an embossing roller.

In some embodiments, the method further comprises applying the roof deck bonding material 27 (e.g., butyl or other adhesive) on the bottommost surface of the exterior sheet 12 so as to produce a self-adhesive exterior sheet 12. The release liner 29 may then be applied on the roof deck bonding material 27 opposite to the exterior sheet 12.

EXAMPLES

Example 1: Single Layer Embossed Exterior Sheet

A plain, unembossed, polyester fabric with an area density of 140 grams per square meter was fed through a hot embossing line consisting of two rotatable rollers to produce an embossed polyester fabric on both surfaces. The tearing strengths (the machine direction (MD) tensile strength/cross machine direction (CD) tensile strength) of each of the plain and embossed polyester fabric were measured in accordance with ASTM D1970. The tearing strength of the plain polyester fabric was 87/56 lb, which increased to 108/83 lb after embossment.

The adherence strength between a polyurethane foam adhesive that is adhered to each of the plain and embossed polyester fabric by a commercially available roof tile adhesive product sold under the trademark Tile Bond™ were also measured. Tile Bond was applied on the polyester fabric, and was kept under pressure at 0.1205 lb/in$^2$ for 72 hours at room temperature. The adhesion strength between the foam adhesive and the polyester fabric was measured on 3-inch by 8-inch samples, in tensile machine with a delamination speed of 50 mm/min. The adhesion strength between the foam adhesive and the plain polyester fabric was 10.5 lbs/3 inch, which increased to 16.3 lbs/3 inch after embossment.

Example 2: Single Layer Embossed Exterior Sheet and Multi-Layer Embossed Exterior Sheet A single layer embossed exterior sheet was prepared by feeding a plain, smooth surfaced PET fleece fabric with a weight of 178 g/m$^2$ and thickness of 37.1 mils through a hot embossing line consisting of two rotatable embossing rollers to produce an embossed PET fabric with an embossed texture on both surfaces. A multi-layer embossed exterior sheet was prepared by feeding a plain, smooth surfaced PET fleece fabric with a weight of 178 g/m² and thickness of 37.1 mils through a hot embossing line consisting of two rotatable embossing rollers to produce a first embossed PET fabric with an embossed texture on both surfaces. A second layer of PET fleece is bonded to the embossed PET fabric by a bonding material comprising a blend of polypropylene and polyethylene to produce a three layer composite exterior sheet, and the composite exterior sheet is then fed through a pair of rotatable rollers to be pressed therebetween. The three layer composite exterior sheet has a weight of 265 g/m² and thickness of 46 mils. The tensile strength, percent elongation and tear strength of each of the single layer embossed exterior sheet and multi-layer embossed exterior sheet were tested in accordance with ASTM D1970, and the results are shown in Table 1 below.

TABLE 1

| | Single Layer Embossed Exterior Sheet | Multi-layer Embossed Exterior Sheet |
|---|---|---|
| Tensile Strength (Machine Direction or MD) | 46.9 lbf/in | 53 lbf/in |
| Tensile Strength (Cross Machine Direction or CD) | 45.7 lbf/in | 45.1 lbf/in |
| Elongation MD | 35.8% | 35.6% |
| Elongation CD | 49.63% | 58.4% |
| Tear Strength MD | 108.3 lbf | 108.7 lbf |
| Tear Strength CD | 83.6 lbf | 93.5 lbf |

Example 3: Embossed Exterior Sheet with Foam Adhesive

The embossed PET fabric is adhered to a commercially available polyurethane foam adhesive sold under the trademark Lepage® Tite Foam as well as one that is sold under the trademark Dow Chemical® Tite Foam, both by a commercially available roof tile adhesive product sold under the trademark Tile Bond™. The three layer composite exterior sheet is then adhered to a commercially available polyurethane foam adhesive sold under the trademark Lepage® Tite Foam at a side opposite to the embossed PET fabric by a commercially available roof tile adhesive product sold under the trademark Tile Bond™. The adhesion strengths between the foam adhesive and the respective embossed exterior sheets are measured, and the results shown in Table 2 below are the average of three measurements.

TABLE 2

| | Average Adhesion Strength (lbf/3 in) |
|---|---|
| Single layer embossed exterior sheet bonded to LePage® Tite Foam | 16.3 |
| Single layer embossed exterior sheet bonded to Dow Chemical® Tite Foam | 18 |
| Multi-layer embossed exterior sheet bonded to LePage® Tite Foam | 12 |

Example 4: Comparative Data with Competitors' Roofing Underlayments

The adhesion strengths between the foam adhesive and the embossed exterior sheets that are produced using the methods described in Example 2 are compared with the adhesion strengths between the foam adhesive and four different roofing underlayment products that are currently available in the market. The competitors' roofing underlayment are adhered to a commercially available polyurethane foam adhesive sold under the trademark Lepage® Tite Foam and/or one that is sold under the trademark Dow Chemical® Tite Foam by a commercially available roof tile adhesive product sold under the trademark Tile Bond™. The adhesion strengths between the foam adhesive and the respective embossed exterior sheets or competitor's roofing underlayment are measured, and the results are shown in Table 3 below.

TABLE 3

| | Adhesion Strength (lbf/3 in) |
|---|---|
| Single layer embossed exterior sheet bonded to LePage® Tite Foam | 16.3 |
| Single layer embossed exterior sheet bonded to Dow Chemical® Tite Foam | 18 |
| Multi-layer embossed exterior sheet bonded to LePage® Tite Foam | 12 |
| Competitor A roofing underlayment bonded to Dow Chemical® Tite Foam | 7 |
| Competitor B roofing underlayment bonded to Dow Chemical® Tite Foam | 3.7 |
| Competitor C roofing underlayment bonded to LePage® Tite Foam | 5.8 |
| Competitor C roofing underlayment bonded to Dow Chemical® Tite Foam | 5.5 |
| Competitor D roofing underlayment bonded to Dow Chemical® Tite Foam | 11 |

Example 5: Slip Resistance of the Plain PET Fleece and Embossed PET Fleece

A series of slip resistance tests were performed on the embossed and plain PET fleece. The kinetic and static coefficients of friction (COF) for the machine direction (MD) and cross machine direction (CD) were measured on the embossed PET fleece and the plain PET fleece in accordance with ASTM D1894. Another set of slip resistance tests involves measuring the frictional force necessary to keep a shoe heel from slipping on a wet walking surface that is inclined at various angles (the "Wet Shoe Test"). The results show the difference between the results of the embossed PET fleece and the plain PET fleece presented as the percent increase in slip resistance of the material after embossment.

TABLE 4

| | Percent (%) Increase (Embossed PET Fleece - Plain PET fleece/Plain PET Fleece) |
|---|---|
| MD Static COF | 6.36% |
| CD Static COF | 7.34% |
| MD Kinetic COF | 5.88% |
| CD Kinetic COF | 0% |
| Wet Shoe Test at 0° | 5.84% |
| Wet Shoe Test at 15° | 10.41% |
| Wet Shoe Test at 25° | 7.88% |
| Wet Shoe Test at 30° | 3.39% |

Example 6A: Hydrophobicity of the Plain PET Fleece and Embossed PET Fleece

The hydrophobicity or water repellency between the plain PET fleece and embossed PET fleece was compared by measuring a water contact angle of a water droplet on a plain PET fleece and an embossed PET fleece at time=0 and after the water droplet was maintained on the respective fleece materials for three minutes. At time=0, the contact angles of the water droplet on both the plain PET fleece and the embossed PET fleece were very similar, both having an angle between about 1220 and about 127°. After maintaining the water droplet on the respective fleece materials for about three minutes, the contact angle of the water droplet on the plain fleece was close to 0 (i.e., the water drop has been fully or substantially absorbed into the plain fleece) and the contact angle of the water droplet on the embossed fleece was about 97.9°. The water contact angles were measured in accordance with ASTM D7334.

Example 6B: Hydrophobicity of the Plain PET Fleece and Embossed PET Fleece

The hydrophobicity or water repellency between a composite sheet comprising a plain PET fleece and a composite sheet comprising an embossed PET fleece was compared. The hydrophobicity between the two composite sheets was compared by measuring the contact angles of a water droplet on the plain PET fleece and the embossed PET fleece at time=0 and after the water droplet was maintained on the respective fleece materials at timed intervals over the course of 30 minutes. The results in the table below show the change in water contact angle over the course of 30 minutes between the plain PET fleece and embossed PET fleece. The water contact angles were measured in accordance with ASTM D7334. Both of the composite sheets comprise a PET fleece material having a weight of 340 g/m², a layer of release liner having a weight of 30 g/m², and a layer of butyl having a weight of 650 g/m² arranged between the PET fleece and the release liner.

TABLE 5

| | Test time (minutes) | | | | | |
|---|---|---|---|---|---|---|
| | 0 | 2 | 5 | 10 | 15 | 30 |
| Embossed PET | 134.4° | 129.4° | — | 126.8° | — | 116.2° |
| Plain PET | 128.9° | 123.7° | 117.1° | 76.4° | 72.4° | — |

Example 7: Single Layer Embossed Exterior Sheet and Multi-Layer Embossed Exterior Sheet in Combination with a Layer of Butyl A single layer embossed exterior sheet consisting of an embossed PET fleece fabric and a multi-layer (three-layer) embossed exterior sheet comprising an embossed PET fleece fabric on the uppermost layer of the exterior sheet were prepared using the method described in Example 2. The single layer embossed exterior sheet has a weight of 178 g/m² and thickness of 37.1 mils. The three-layer embossed exterior sheet has a weight of 265 g/m² and thickness of 46 mils. A layer of butyl was applied on each of the single layer embossed exterior sheet and the three-layer composite embossed exterior sheet. Two different types of butyl compositions identified as "butyl type 2" and "butyl type 4B" in the table below, each with a weight of 700 g/m², were used to produce four different products. One or more of tensile strength, percent elongation, tear strength, nail sealability, thermal stability and peel adhesion of the products were tested in accordance with ASTM D1970, and slippage resistance was tested in accordance with TAS 103. The results are shown in Table 6 below.

TABLE 6

| | Single layer embossed exterior sheet with butyl type 2 | Multi-layer embossed exterior sheet with butyl type 2 | Single layer embossed exterior sheet with butyl type 4B | Multi-layer embossed exterior sheet with butyl type 4B |
|---|---|---|---|---|
| Total weight | 906 g/m² | 993 g/m² | 906 g/m² | 993 g/m² |
| Total thickness | 56 mils | 63 mils | 53 mils | 62 mils |
| Tensile Strength (MD) | 43.7 lbf/in | 74.8 lbf/in | Not measured | Not measured |
| Tensile Strength (CD) | 38.9 lbf/in | 43.6 lbf/in | Not measured | Not measured |
| Elongation (MD) | 71.7% | 63.2% | Not measured | Not measured |
| Elongation (CD) | 105.2% | 111.3% | Not measured | Not measured |
| Tear Strength (MD) | 95.4 lbf | 120.1 lbf | Not measured | Not measured |
| Tear Strength (CD) | 76.8 lbf | 100.3 lbf | Not measured | Not measured |
| Nail Sealability on Plywood | PASS | PASS | PASS | PASS |
| Thermal Stability at 270 F at 45° | PASS after being exposed for 4 hours for the single layer embossed exterior sheet or 7 hours for the multi-layer embossed exterior sheet (No delamination observed between the exterior sheet and the layer of butyl. No signs of any butyl running down on plywood.) | | | |
| Peel Adhesion at 23° C. | 17.3 lbf/ft | 20.7 lbf/ft | 26.4 lbf/ft | 26.4 lbf/ft |
| Peel Adhesion at 4° C. | 39.2 lbf/ft | 39.2 lbf/ft | 52 lb/ft | 52 lb/ft |
| Slippage resistance | PASS (at 6 days) | | | |

Example 8: Embossed PET Fleece and Embossed Polypropylene Fleece

A plain, unembossed, PET fabric with an area density of 140 grams per square meter was fed through a hot embossing line consisting of two rotatable rollers to produce an embossed PET fabric on both surfaces. A plain, unembossed, polypropylene (PP) fabric with an area density of 110 grams per square meter was fed through a hot embossing line consisting of two rotatable rollers to produce an embossed PP fabric on both surfaces.

The adherence strengths between a polyurethane foam adhesive that is adhered onto each of the embossed PET fabric and the embossed PP fabric were measured. The polyurethane foam adhesive is a commercially available roof tile adhesive product sold under the trademark Tile Bond™. Tile Bond was applied on each of the PET fabric and the PP fabric, and was kept under pressure at 0.1205 lb/in² for 72 hours at room temperature. The adhesion strength between the foam adhesive and the PET fabric was 16.3 lbs/3 inch. The adhesion strength between the foam adhesive and the PP fabric was 5.5 lbs/3 inch.

The adhesion strength between the foam adhesive and the exterior surface of the fabric (e.g., PET (embossed or plain) or PP) in the above Examples were measured in accordance with the following method. Two pieces of fabric having the dimensions 3±0.125 by 8±0.125" were prepared. The top 3" of one of the pieces of fabric was covered with a commercially available polyurethane foam adhesive as specified in the Examples. The second piece of fabric was adhered onto the polyurethane foam adhesive opposite to the first piece of fabric and aligned with the first piece of fabric to form a composite. Two pieces of plywood with the dimensions 4×8" were arranged to press against the composite at opposing surfaces thereof for 48 hours. The two pieces of fabric each comprises an end opposite to the end at which the fabric was adhered together by the polyurethane foam adhesive (the "peel arms"). The peel arms were clamped in opposing 3" pulling jaws of a tensile tester and were pulled apart at a constant speed of 50 mm/min. The force to pull the peel arms apart was recorded.

Throughout the foregoing description and the drawings, in which corresponding and like parts are identified by the same reference characters, specific details have been set forth in order to provide a more thorough understanding to persons skilled in the art. However, well known elements may not have been shown or described in detail or at all to avoid unnecessarily obscuring the disclosure.

As will be apparent to those skilled in the art in the light of the foregoing disclosure, many alterations and modifications are possible in the practice of this invention without departing from the scope thereof. Accordingly, the description and drawings are to be regarded in an illustrative, rather than a restrictive, sense.

What is claimed is:

1. A roofing system comprising:
   a roof deck;
   a roofing underlayment overlying the roof deck, the roofing underlayment comprising:
      a first fleece layer consisting of a first fleece material,
         wherein the first fleece layer contacts a surface of the roof deck;
      a scrim layer consisting of an open scrim material,
         wherein the scrim layer contacts the first fleece layer; and
      a second fleece layer consisting of a second fleece material,
         wherein the second fleece layer contacts the scrim layer,
         wherein the second fleece material comprises polyethylene terephthalate, and
         wherein the second fleece layer has an uppermost surface opposite to the scrim layer,
            wherein the uppermost surface has an embossed texture,
               wherein the embossed texture comprises protrusions and channels between the protrusions,
               wherein the channels are plain and free of textures embossed thereon,
         wherein the second fleece layer has a bottommost surface contacting the scrim layer,
            wherein the bottommost surface has an embossed texture,
   a foam adhesive on the uppermost surface of the second fleece layer,
      wherein an adhesion strength between the foam adhesive and the uppermost surface of the second fleece layer is 10 to 30 lbf/3 in; and
   a roofing material on the foam adhesive.

2. The roofing system according to claim 1, wherein the roofing underlayment comprises a selvage edge.

3. The roofing system according to claim 1, wherein the open scrim material comprises at least one of fiberglass, polypropylene, and polyethylene.

4. The roofing system according to claim 1, wherein the foam adhesive comprises a polyurethane-based foam.

5. The roofing system according to claim 1, wherein the foam adhesive comprises an expandable foam adhesive.

6. The roofing system according to claim 1, wherein the foam adhesive comprises a polyurethane-based foam, and wherein the roofing material comprises a roofing tile.

7. The roofing system according to claim 1, wherein the foam adhesive comprises an expandable foam adhesive, and wherein the roofing material comprises a roofing tile.

8. The roofing system according to claim 1, wherein the roofing material comprises a roofing tile.

9. A roofing system comprising:
   a roof deck;
   a roofing underlayment overlying the roof deck, the roofing underlayment comprising:
      a first fleece layer consisting of a first fleece material,
         wherein the first fleece layer contacts a surface of the roof deck;
      a first adhesive layer;
      a scrim layer consisting of an open scrim material,
         wherein the first adhesive layer adheres the first fleece layer to the scrim layer;
      a second adhesive layer;
      a second fleece layer consisting of a second fleece material,
         wherein the second adhesive layer adheres the second fleece layer to the scrim layer;
         wherein the second fleece material comprises polyethylene terephthalate,
         wherein the second fleece layer has an uppermost surface opposite to the scrim layer,
            wherein the uppermost surface has an embossed texture,
               wherein the embossed texture comprises protrusions and channels between the protrusions,
               wherein the channels are plain and free of textures embossed thereon,
         wherein the second fleece layer has a bottommost surface contacting the scrim layer, wherein the bottommost surface has an embossed texture,
a foam adhesive on the uppermost surface of the second fleece layer,
wherein an adhesion strength between the foam adhesive and the uppermost surface of the second fleece layer is 10 to 30 lbf/3 in; and
a roofing material on the foam adhesive.

10. The roofing system according to claim 9, wherein the roofing underlayment comprises a selvage edge.

11. The roofing system according to claim 9, wherein the open scrim material comprises at least one of fiberglass, polypropylene, and polyethylene.

12. The roofing system according to claim 9, wherein the foam adhesive comprises a polyurethane-based foam.

13. The roofing system according to claim 9, wherein the foam adhesive comprises an expandable foam adhesive.

14. The roofing system according to claim 9, wherein the foam adhesive comprises a polyurethane-based foam, and wherein the roofing material comprises a roofing tile.

15. The roofing system according to claim 9, wherein the foam adhesive comprises an expandable foam adhesive, and wherein the roofing material comprises a roofing tile.

16. The roofing system according to claim 9, wherein the roofing material comprises a roofing tile.

* * * * *